United States Patent [19]

Stoll

[11] 3,711,939
[45] Jan. 23, 1973

[54] METHOD AND APPARATUS FOR SEALING

[76] Inventor: Milton Stoll, Old Post Road, Rogers Lake, Olde Lymne, Conn. 06371

[22] Filed: Nov. 10, 1970

[21] Appl. No.: 88,276

Related U.S. Application Data

[63] Continuation-in-part of Ser. Nos. 642,627, May 4, 1967, Pat. No. 3,479,487, Ser. No. 656,622, July 11, 1967, Pat. No. 3,551,127, and Ser. No. 712,578, Feb. 15, 1968, Pat. No. 3,551,645, and Ser. No. 558,142, June 16, 1966, Pat. No. 3,490,886.

[52] U.S. Cl. ............... 29/494, 29/488, 29/497.5, 53/39, 156/285, 156/382, 174/DIG. 3

[51] Int. Cl. ............................................. B23k 31/02

[58] Field of Search ..156/285, 382; 53/39; 29/497.5, 29/488, 494; 174/DIG. 3; 29/501

[56] References Cited

UNITED STATES PATENTS

| | | | |
|---|---|---|---|
| 3,383,260 | 5/1968 | Mojonnier | 156/285 X |
| 3,405,019 | 10/1968 | Seil et al. | 156/382 X |

*Primary Examiner*—Edward G. Whitby
*Attorney*—Lackenbach & Lackenbach

[57] ABSTRACT

Methods and apparatus for sealing flat packs for electronic micro circuits within a sealing chamber and modulating the atmospheric pressure within the chamber to assist in the formation of the desired seal.

18 Claims, 4 Drawing Figures

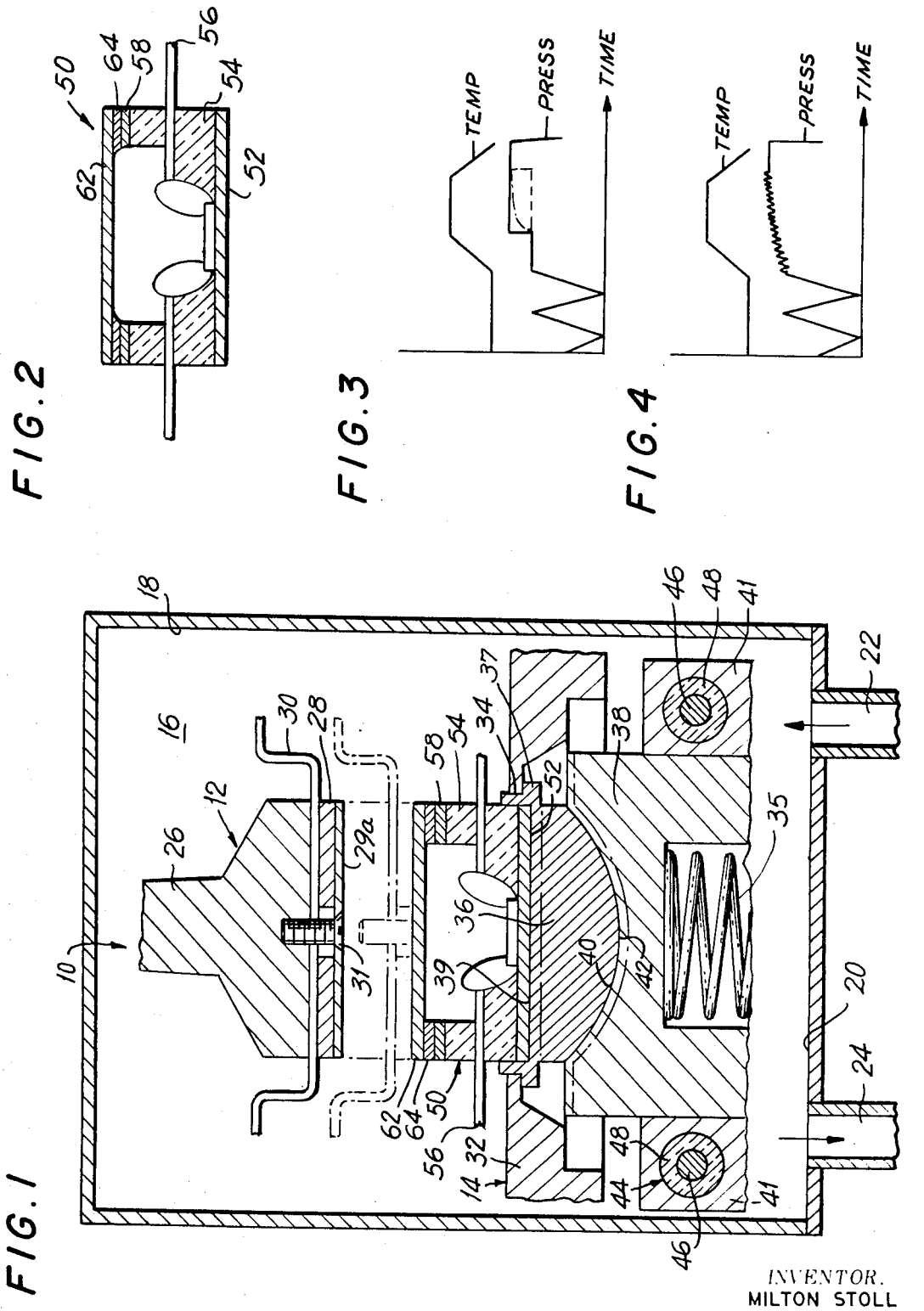

METHOD AND APPARATUS FOR SEALING

This application is a continuation-in-part application of my co-pending applications Ser. No. 642,627, now U.S. Pat. No. 3,479,487; Ser. No. 656,622, now U.S. Pat. No. 3,551,127; and Ser. No. 712,578, now U.S. Pat. No. 3,551,645 and of my earlier application Ser. No. 558,142 filed June 16, 1966 and now U.S. Pat. No. 3,490,866. The complete disclosures of each of these prior applications is expressly incorporated herein and particularly to whatever extent may be necessary to the granting of a full and complete scope of protection under the patent laws.

In application Ser. No. 558,142, an end portion of a tubular glass sleeve is heated by the application of predominantly radiant energy thereto within a controlled atmosphere chamber to the softening point of the glass and then the atmosphere within the chamber is post pressurized to a higher pressure to work and mold the glass inwardly against a generally axially extended feed-through terminal element. In application Ser. No. 656,622, there is disclosed and claimed methods, apparatus and systems for sealing lids or small rectangular enclosures for electronic devices generally referred to as flat-packs by the controlled heating, annealing and cooling thereof along an accurately controlled temperature profile. There is also disclosed therein methods, apparatus and systems for post pressurizing during such sealing. Applications Ser. No. 642,627 and 712,578 respectively relate to temperature controllers and heater structures, per se.

During heat sealing of any flat-pack, whether along a programmed temperature profile or otherwise, after an initial seal is formed, the mass of gas sealed within the flat pack is fixed, so that any further changes in temperature, including equalization of temperatures throughout the package and contents, result in pressure changes to the gas sealed therein. Such internal pressure changes, as well as the effects of out-gassing tend to interfere with the formation of a proper seal so long as the seal area remains plastic. Post-pressurization, however, can counter effect such pressure changes and out-gassing, as well as enable a finer control over the sealing, whether the heating thereof is along a predetermined controlled temperature profile as in the prior application or not.

Accordingly, in addition to the objects and important features set forth in my earlier applications, it is a primary object of the present invention to provide methods, means and apparatus for heat sealing of flat-packs, or the like, utilizing the controlled application of fluid pressure thereto.

Another primary object of the present invention, in addition to the foregoing objects, is the provision of novel methods, means and apparatus for the sealing of flat-packs, or the like, by the application of post pressurization thereto.

Another primary object of the present invention, in addition to each of the foregoing objects, is the provision of novel methods, apparatus and systems for the treatment of electronic package components, such as the heat sealing of flat-packs, or the like.

Another primary object of the present invention, in addition to each of the foregoing objects, is to provide novel methods, apparatus and systems for sealing flat-packs, or the like, within atmospherically controlled chamber means.

Still another primary object of the present invention, in addition to each of the foregoing objects, is the provision of novel methods, apparatus and systems for controlling heat sealing of flat-packs, or the like, by the application of post-pressurization.

The invention resides in the improved methods, apparatus and systems hereinafter described in accordance with the principles of this invention. The present invention will be better understood and objects and important features other than those specifically enumerated above will become apparent when consideration is given to the following details and description which taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIG. 1 is a schematic elevational cross-sectional illustration of a heat sealing station in accordance with the present invention in the open position thereof with a flat-pack and cover therefor positioned for sealing;

FIG. 2 is an elevational cross-sectional illustration of the completed and sealed package as formed by this invention;

FIG. 3 is a graph illustrating the temperature and pressure profiling of the present invention;

FIG. 4 is a graph illustrating a modified pressure profiling in accordance with this invention.

With reference now to the drawing, and particularly to FIG. 1 thereof, there is shown and illustrated in schematic form a sealing station corresponding generally to one of the stations more fully set forth in my co-pending parent application Ser. No. 656,622, now U.S. Pat. No. 3,551,127 and, with the exception of the modifications expressly described below, a full and complete description thereof appears in my said co-pending parent application and is expressly incorporated herein by reference.

Generally, the work station is generally designated by the reference character 10 and may comprise an upper assembly 12 and a lower assembly 14 all disposed within a sealable, pressure controlled chamber 16 which may be defined, for example, by a bell jar 18 and a base 20 movable relative to one another to open and close the chamber 16. Conduit means, such as an inlet conduit 22 and an outlet conduit 24 may be provided for admitting and exhausting a sealing fluid, such as an inert or non-reactive gas into the chamber 16 for flushing reactive or contaminative gases therefrom and for enabling pressure control therewithin.

In general, the upper assembly 12 may comprise a thermally conductive support post 26 carrying, at its lower end portion a heat transfer block 28 comprising, for example, silver or other material of high thermal conductivity to rapidly distribute heat therethrough and a facing 29 adapted to contact the package and transmit heat thereto without sticking, and comprising, for example, stainless steel or an oxide layer, and a resistance heater element 30 connected to a source of power as, for example, by means of a programmable temperature controller such as that described and disclosed in my co-pending application Ser. No. 642,627, now U.S. Pat. No. 3,479,487, all held together, as by a flat head machine screw 31.

The lower assembly 14 may comprise, for example, a plate 32 having an aperture 34 therein with a nest 36 and nest seat 38 disposed therebeneath and extending therethrough, the nest 26 and nest seat 38 being provided, for example, with mutually engaged spherical surfaces 40 and 42, respectively, to enable the nest 36 to be self-aligning and with spring or biasing means 35 being provided for urging the next seat 38 upwardly towards the upper assembly 12. Further, the nest 36 may comprise a flange 37 for limiting upward movement and a socket of recess 39 for retaining the package to be sealed. The nest seat 38 may be slidable supported within an outer block 41.

Additionally, substrate heater means 44 comprising, for example, conduit means through which a heated or chilled fluid may be circulated or, as shown, a resistance wire or bus bar 46 enclosed within a ceramic sheath 48 may be provided within the lower assembly 14, as, for example, within a passage provided within the outer block 41 adjacent the nest seat 38, in a manner similar to the substrate heater described and disclosed in my co-pending application Ser. No. 880,867, now U.S. Pat. No. 3,621,186 to enable the rate of heat transfer downwardly through the package to be yet more finely controlled and to promote outgassing of the package prior to sealing so that pressure change during sealing may be more accurately predicted and balanced.

The heater surface 28 and the nesting recess 39 are preferably particularly configured to correspond to a particular package size and shape. For example, there is shown and illustrated disposed on the nest 36, a flat package 50 which may comprise a generally rectangular bottom plate 52 fabricated, for example, of Kovar previously bonded to a glass ring or lead frame 54 having the lead assemblies 56 previously embedded therein and a Kovar ring 58 previously bonded on the upper surface thereof.

A Kovar lid or cover plate 62 may be provided substantially similar the configuration to the bottom plate 52 adapted to be sealed, along its periphery, with the Kovar ring 58, as by means of a solder seal with the solder being provided in the form of a ring-shaped preform 64 having a configuration substantially similar to the configuration of the Kovar ring 58 and which, upon heating, may be melted to bond the Kovar ring 58 and the Kovar lid 62 together and thereby hermetically seal the package 50.

If a flat package is positioned on the nest 36 with the solder preform 64 and the cover or lid 62 positioned on top, as shown in FIG. 1, and the upper assembly 12 and the lower assembly 14 brought together with a slight overriding action, as shown by the phantom lines in FIG. 1, so that the package 50 and nest 36 are slightly depressed, then the upward biasing of the nest seat 38 and the interengaging spherical surfaces 40 and 42 will enable the heat transfer surface 28 to firmly and accurately completely engage the upper surface of the lid 62 and apply a normal force thereto dependent upon the magnitude of the biasing force on the nest seat 38. Next, the chamber 16 may be thoroughly flushed, as will be described in more detail hereinafter, and filled with an inert or non-reactive gas, such as dry nitrogen, through the conduits 22 and 24. Then, if energy is applied to the heater 30 so as to generate heat therein, heat will flow therefrom downwardly through the heat transfer surface 28 and into the Kovar lid 62, flowing downwardly therethrough into the package and into the solder preform 64 and Kovar ring 58. Because of the poor heat transfer characteristics of the gas within the package 50, in comparison with the heat transfer characteristics of the Kovar and solder, a major portion of the heat energy will flow into the solder 64, rather than initially into the gas within the package 50. Prior to actual melting of the solder preform, however, any gas pressure buildup within the package 50 will be bled outwardly between the solder preform 64 and the adjacent Kovar lid 62 and Kovar ring 58, respectively, until such time as the solder preform 64 melts and wets the Kovar ring 58 and Kovar lid 62, at which point sealing will occur, tending to confine any additional gas pressure buildup within the package 50. Any additional gas pressure building within the package 50, due to either heat transfer to the trapped gas from the package structure or due to any outgassing will, after the solder preform 64 has melted, tend to blow the molten solder outwardly from between the Kovar lid 62 and Kovar ring 58. If the buildup in pressure within the package, however, is countered or opposed by subsequent post-pressurization of the chamber 16, as by opening the high pressure nitrogen valve as more fully described and disclosed in the aforesaid prior applications, with the high pressure nitrogen being of a sufficient value to just balance the pressure buildup, then, rather than being blown outwardly by the internal pressure buildup, the molten solder will be retained properly disposed between the Kovar ring 58 and the Kovar lid 62 so that the surface tension and wetting abilities thereof may form proper meniscus solder formation and solidification, as illustrated schematically in FIG. 2. An excess of post-pressurization, however, will tend to blow the solder inwardly of the package 50, resulting in at least as high, if not a higher rate of improper sealing. The exact degree of post-pressurization required must be determined for each package configuration experimentally but, in general, it has been found that for packages of approximately 1 X⅞ inch rectangular configuration, a post-pressurization of approximately 5 pounds per square inch, with a starting pressure of 6 psi, produces the highest rate of reliable sealing; however, other pairs of pressures can be used.

In general, the slower the heating of the package, the less post pressure is required since the gas within the package will be more nearly the lid temperature before initial sealing occurs. Conversely, the cooler the gas in the package at the instant of initial sealing, the higher will be the required post pressure. Similarly, the larger the volume of the package, especially when associated with increased package depth and/or the higher the lid temperature, the higher will be the post pressure required. If outgassing occurs after formation of the initial seal, this will also require a higher post pressure. Since outgassing, however, is very difficult to predict and can vary widely based upon the history of the package, storage temperature, humidity, etc., it is preferable that outgassing be eliminated, rather than to attempt to compensate for it, or at least that if any outgassing is going to occur, that it be completed prior to initial sealing, as by a slow heat cycle or through substrate heating.

The time at which post-pressurization occurs is of the utmost importance and can vary with the package material. For example, where the seal comprises solder, as in the illustrated package, since the solder has a definite melting point, and is very fluid or non-viscous, it is desirable that the post-pressurization occur as nearly simultaneously with fluidization of the solder as possible. With particular reference to FIG. 3, if the temperature is programmed, as described and disclosed in my aforesaid prior applications so as to have a programmed rise, a programmed dwell $b$ and a programmed decrease $c$, then the post-pressurization should occur substantially at the beginning of the dwell time $b$, or during the dwell time as indicated by the solid pressure line on the graph. Where, however, a glass-to-glass seal is utilized, since glass does not have a definite melting point but, rather, becomes increasingly softened, and is a highly viscous liquid, the time for post-pressurization may be delayed and, for example, may occur at the end of the dwell period, as indicated by the dashed pressure curve on the graph. The rate at which post pressure is applied may also be varied, within the present invention, from an almost instantaneous build-up or pulse to a slow buildup substantially coinciding with or even lagging behind the internal pressure buildup, or any programmed pressure curve. For example, the buildup may be almost instantaneous, as shown by the solid pressure line in FIG. 3, as by a large conduit and valve connection, or slowly assymptotic to the final pressure as shown by the phantom pressure line therein, as by bleeding the high pressure gas into the chamber 16 through an orifice, restricted valve, or small diameter piping. A pressure transducer may even be incorporated within the package and the post-pressurization programmed therefrom.

In addition to merely compensating for the increasing internal gas pressure by increasing the pressure external to the package and thereby preventing blow holes, it is effective to hold the external post pressure at a somewhat higher pressure than that developed internally to the package. The result of the increased external pressure is to force the molten solder to the inside of the package where a fillet is readily formed between the seal frame and the cover, as shown in FIG. 2. This filleting may be further enhanced by the heater design, and particularly by heating substantially the entire cover. Since the heat flow downwardly of the cover is more rapid at the periphery, i.e., into the solder and seal frame, the center of the cover will be slightly hotter, thereby tending to draw the molten solder inwardly of the seal.

There is also shown on the graph of FIG. 3, a novel method of rapidly and efficiently flushing the chamber 16 so as to produce a very clean and dry atmosphere therewithin. After the chamber 16 has been closed, a vacuum is drawn therein through the exhaust conduit 24 which preferably is disposed adjacent one end portion thereof and then dry nitrogen or other inert or non-reactive gas is admitted to the chamber 16 through the inlet conduit 22, preferably disposed adjacent the other end portion thereof. Then, the chamber 16 is evacuated and backfilled a second time. In this way, if, for example, evacuation and backfill is effective to reduce contamination by a factor of 1,000, the second evacuation and backfill multiplies that 1,000 factor by an additional 1,000 factor so that the resultant atmosphere is effectively cleansed of contaminants by a factor of one million. To accomplish the evacuation rapidly and economically, since the novel cycling of the present invention does not demand extraordinarily high vacuums, there may be connected with the chamber 16, through appropriate valving, a large tank which is constantly being pumped out by a conventional high vacuum pump. For example, if the tank had a volume equal to 100 times the volume of the chamber 16, when the valving between the tank and the chamber was opened, the pressure within the chamber 16 would almost immediately drop to one one-hundredth the initial pressure although the vacuum pump capacity might be relatively small since it would have a substantial period of time within which to evacuate the vacuum tank. As shown, after the chamber 16 is twice evacuated and backfilled, temperature profiling and subsequent post-pressurization cycling may then be initiated.

As a further aid in providing rapid and effective sealing, means may be provided to aid in wetting of the lid 62 and ring or frame 58 by the solder 64 quickly and completely, as by providing a scrubbing action therebetween to break down any oxide or other barrier film or impurities which may be present on the lid 12, ring or frame 58 or solder 64 and to break the surface tension of the solder 64. Substantially any small vibratory movement would be effective to accomplish this result. For example, electrically operable vibratory means may be incorporated into the lower assembly 14. Further, if a low voltage, high amperage, alternating current is utilized to energize the heaters, the rapidly changing field itself produces a vibratory effect in the package and lids sufficient to cause a scrubbing action, especially during the dwell period. Yet further, as a further aid in providing effective sealing, and with reference now particularly to FIG. 4 of the drawing, if either prior to, following, or during the buildup of post-pressurization, the pressure is rapidly modulated so as to provide a vibratory effect, the package lid 62 may be effectively vibrated on the molten solder to aid the solder in wetting and subsequently adhering thereto.

While the present invention has been particularly shown and described as applied to a Kovar-Solder-Kovar seal, it is also applicable, as pointed out above to glass sealing and, hence, may be used with a Kovar-Solder-Ceramic; Kovar(Gold-plated)-Solder-Kovar; Kovar(Gold-plated)-Solder-Kovar(Gold-plated); Ceramic(Gold-plated)-Solder-Ceramic(Gold plated); Ceramic(Gold-plated)-Solder-Kovar; Kovar-Solder-Ceramic; Kovar-Glass Frit-Kovar; Kovar-Glass Frit-Glass; Kovar-Glass Frit-Ceramic; Ceramic-Glass Frit-Glass; etc. The solder may be either a soft solder or a hard solder such as Gold-Germanium, Gold-tin, or the like.

While the invention has been herein described, disclosed, illustrated and shown in terms of an embodiment or modification which it has assumed in practice, the scope of the invention should not be deemed to be limited by the precise embodiments or modifications herein described, disclosed, illustrated or shown, such other embodiments or modifications as may be suggested to those having the benefit of the teaching herein being intended to be reserved especially as they fall within the scope and breadth of the claims here appended.

What is claimed is:

1. Method of sealing flat packages, especially flat packs for electronic components and circuits comprising, at least the steps of, heating the package to a temperature sufficient to soften a sealing portion thereof to wet and bond with at least an adjacent portion and post-pressurizing the package environment to balance internal pressure buildup and preclude blowing out of the softened sealing portion.

2. Method defined in claim 1 wherein said post-pressurizing is to an increased pressure only sufficient to maintain the softened sealing portion in position and prevent gas pressure flow thereof inwardly or outwardly of the package.

3. Method as defined in claim 1 wherein said step of heating comprises heating to a sealing temperature and maintaining the temperature at said sealing temperature for a dwell period and wherein said post-pressurizing is applied at substantially the beginning of said dwell.

4. Method defined in claim 1 wherein said step of heating comprises heating to a sealing temperature and maintain the temperature at said sealing temperature for a dwell period and wherein said post-pressurizing is applied at substantially the end of the dwell period.

5. Method defined in claim 1 wherein said step of heating comprises heating to a sealing temperature and maintaining the temperature at said sealing temperature for a dwell period and wherein said post-pressurizing is applied during said dwell period.

6. Method defined in claim 1 wherein said post-pressurizing is applied rapidly.

7. Method defined in claim 1 wherein said post-pressurizing is applied slowly.

8. Method defined in claim 1 wherein said post-pressurizing is applied along a programmed curve.

9. Method defined in claim 1 further comprising, at least the additional step of, vibrating the package to enhance the wetting of the softened seal portion with the adjacent portion.

10. Method defined in claim 9 wherein said vibrating comprises a translatory scrubbing action.

11. Method defined in claim 1 further comprising, at least the additional steps of, modulating the pressure to vibrate the package and thereby enhance the wetting of the softened seal portion with the adjacent portion.

12. Method defined in claim 1 further comprising, at least the additional step of, substrate heating of the package from below.

13. Method defined in claim 1 wherein said post-pressurizing is to a higher pressure than the internal package pressure to force the sealing portion to the package inside to form a fillet.

14. Method defined in claim 1 wherein the sealing is effectuated within a chamber further comprising, at least the additional step of, flushing the chamber by sequentially evacuating and backfilling thereof with inert or non-reactive gas.

15. Method defined in claim 14 further comprising at least the additional steps of, evacuating and backfilling the chamber at least a second time to multiply the degree of freedom from contaminants.

16. Method defined in claim 14 wherein said step of evacuating comprises connecting the chamber with an evacuated tank of substantially larger volume than the volume of the chamber.

17. Apparatus for sealing a flat package, especially a flat pack for electronic components and circuits, comprising, in combination, means for heating at least a sealing portion to a softened state wherein said sealing portion may wet and bond with an adjacent portion and means for post-pressurizing the package environment to balance pressure buildup and enhance seal reliability.

18. Method defined in claim 1 wherein said post-pressurizing is to an increased pressure slightly higher than the internal pressure buildup to urge the softened sealing portion generally inwardly and provide an inward curving miniscus at the exterior of the sealing portion.

* * * * *